J. SHERRIFF.

Mail-Box.

No. 9,253. Reissued June 15, 1880.

WITNESSES:

C. Neveux

C. Sedgwick

INVENTOR:

J. Sherriff

BY Munn & Co

ATTORNEYS.

N. PETERS, PHOTO-LITHOGRAPHER, WASHINGTON, D. C.

UNITED STATES PATENT OFFICE.

JOHN SHERRIFF, OF DEDHAM, MASSACHUSETTS.

MAIL-BOX.

SPECIFICATION forming part of Reissued Letters Patent No. 9,253, dated June 15, 1880.

Original No. 216,229, dated June 3, 1879. Application for reissue filed January 2, 1880.

*To all whom it may concern:*

Be it known that I, JOHN SHERRIFF, of Dedham, in the county of Norfolk and State of Massachusetts, have invented a new and useful Improvement in Mail-Boxes, of which the following is a specification.

Figure 1:
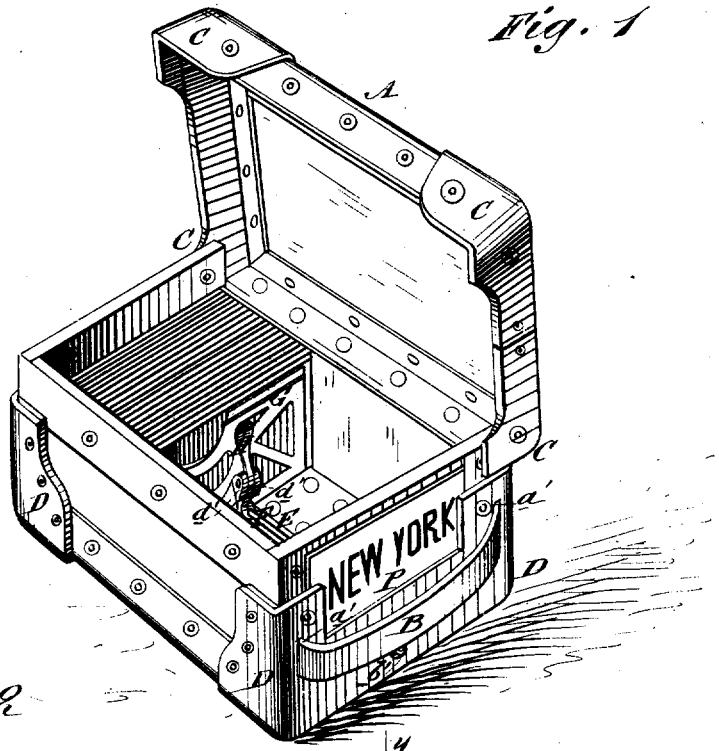
Figure 2:
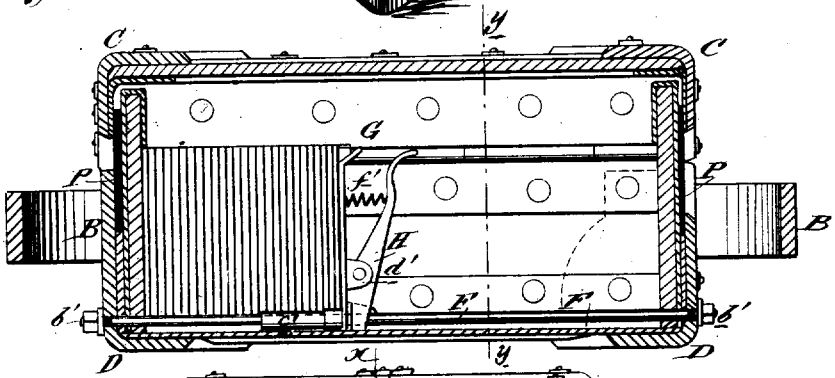
Figure 3:
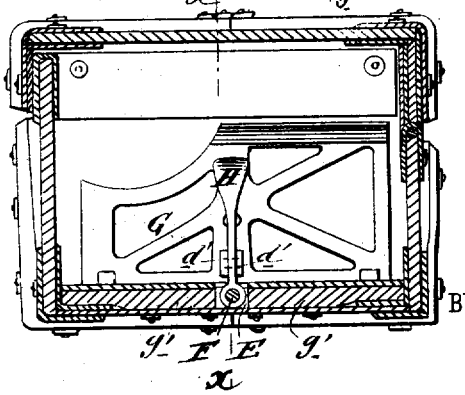

Figure 1 is a perspective view of the open box. Fig. 2 is a longitudinal elevation on line *x x*, Fig. 3. Fig. 3 is a cross-section on line *y y*, Fig. 2.

Similar letters of reference indicate corresponding parts.

The object of this invention is to provide a strong, light, durable, and convenient box or trunk for the transportation of letters and other matter.

The invention consists in a mail-box or a trunk constructed of stout paper-board or vulcanized paper or fiber, and provided with rawhide shields or caps, covering and protecting the ends and corners of the box or trunk.

The invention further consists in an improved mail-box or a trunk composed of stout paper-board or vulcanized paper or fiber, and provided with rawhide shields or caps on the top and bottom portions of the box or trunk, and which extend across the ends and around the corners thereof.

The invention also consists of other features, which will be hereinafter described, and pointed out in the claims.

It further consists of the extended caps or bunters C C and D D, of rawhide, secured to the cover and body, respectively, of the box by rivets, that are entered from the inside of the cover and body, and have their ends struck down on burrs on the outside. The wider portions of these caps D D extend upward and protect the corners of the box and meet the downward-projecting corner-pieces of the caps C C when the box is closed. Across the ends of the box they (the caps D D) are cut away and made narrower, so as to afford sockets or recesses for the display of whatever tag or plate P may be set in them. When the box is opened the tag or plate P may be inserted in or removed from the socket; but when the cover, with its corresponding socket, is closed down the plate cannot be removed, but remains securely fixed.

The handles B B reach entirely across each end of the box, in such a manner that they do not interfere with or obstruct the view of the tags or plates, and their ends, being inserted through cuts or slots *a′ a′* in the end faces of the corner parts of the bunters D D, pass between the bunters and the back and front of the box, and are secured there by one or more of the rivets that hold together the bunters and box-body.

Passing entirely through the box, in the longitudinal groove E in the bottom thereof, is the rod F, that is secured in place by the nuts *b′ b′* or other suitable device on either end. Sliding on this rod F is a sleeve, *c′*, to one end of which is fixed the upright plate G, provided with the perforated ears or lugs *d′ d′*, while embracing the rod with its lower extremity is the thumb-piece or lever H, that is pivoted between the lugs *d′ d′*, and above them is connected to the plate, G, above its center, by the spiral spring *f′*, whose outward pressure upon the top of the thumb-piece causes its lower end to gripe the rod F and press against the plate G in such a manner as to lock the plate and keep it stationary on the said rod. By pressing the top of the thumb-piece H inward against the plate G the lock is released and the plate may be moved at will.

This device is for the purpose of holding firmly in place, so that they shall not become disarranged, whatever letters or packages are put in the box.

The bottom of the box is preferably stiffened by a wooden strip or strips, *g′ g′*, as shown, on the inside thereof, which form the groove E.

The stout paper-board or vulcanized paper or fiber makes a trunk-body of superior stiffness combined with lightness, while the rawhide trimmings are possessed of and add great strength and durability to the trunk or box.

In the patent granted to myself and William S. Soule, August 29, 1876, No. 181,738, is shown and described a rawhide trunk provided with corner protectors or caps, longitudinal angle-pieces, and corrugated re-enforcing strips, the whole formed of rawhide and riveted to the trunk-body.

In my present invention the trunk or case will not be affected by the changes of the atmosphere, owing to its being composed of vulcanized paper or fiber, and, further, the vulcanized paper or fiber is more compact in its nature and effectually impervious to water, is much tougher, and therefore will better withstand the rough usage to which trunks and traveling-cases are subjected.

Having thus fully described my invention, I claim as new and desire to secure by Letters Patent—

1. As an improved article of manufacture, a mail-box or trunk constructed of stout paper-board or vulcanized paper or fiber, and provided with rawhide shields or caps, covering and protecting the ends and corners of the box or trunk, substantially as described, and for the purpose set forth.

2. An improved mail-box or trunk composed of stout paper-board or vulcanized paper or fiber, and provided with the rawhide shields or caps C and D, extending across the ends and around the corners of the box or trunk, substantially as herein described.

3. An improved mail-box or trunk composed of stout paper-board or vulcanized paper or fiber, provided with rawhide shields or corner-protectors C D, the wooden bottom strips $g'$, and the handles B, attached to the corner-protectors D, substantially as and for the purpose described.

4. An improved mail-box or trunk provided with rawhide shields or protectors C D, extended and cut away so as to form sockets or recesses for the plate or card P, substantially as and for the purpose described.

5. The combination, with a mail-box, of the rod F, the sleeve $c'$, the plate G, the thumb-lever H, and the spring $f'$, substantially as and for the purpose described.

JOHN SHERRIFF.

Witnesses:
I. I. STORER,
C. SEDGWICK.